(12) United States Patent
Hidaka

(10) Patent No.: US 7,029,258 B2
(45) Date of Patent: Apr. 18, 2006

(54) INJECTION MOLDING MACHINE SYSTEM

(75) Inventor: Yoshinori Hidaka, Shizuoka-Ken (JP)

(73) Assignee: Toshiba Kikai Kabushiki Kaisha, Tokyo-to (JP)

( * ) Notice: Subject to any disclaimer, the term of this patent is extended or adjusted under 35 U.S.C. 154(b) by 372 days.

(21) Appl. No.: 10/445,880

(22) Filed: May 28, 2003

(65) Prior Publication Data

US 2003/0228386 A1 Dec. 11, 2003

(30) Foreign Application Priority Data

May 28, 2002 (JP) ............................. 2002-153354
Apr. 17, 2003 (JP) ............................. 2003-112936

(51) Int. Cl.
*B29C 45/76* (2006.01)
(52) U.S. Cl. ...................... 425/135; 425/162; 425/595
(58) Field of Classification Search ............... 425/135, 425/162, 595
See application file for complete search history.

(56) References Cited

U.S. PATENT DOCUMENTS 5,323,102 A * 6/1994 Torii et al. .................... 322/90
6,878,317 B1 * 4/2005 Kubota ........................ 425/135

FOREIGN PATENT DOCUMENTS

| CN | 1120760 A | 4/1996 |
| EP | 0685925 A1 | 12/1995 |
| EP | 0 843 398 A3 | 5/1998 |
| GB | 2 346 019 A | 7/2000 |
| JP | 6-217467 A | 8/1994 |
| WO | WO 02/061917 A1 | 8/2002 |

* cited by examiner

*Primary Examiner*—Tim Heitbrink
(74) *Attorney, Agent, or Firm*—Pillsbury Winthrop Shaw Pittman LLP

(57) ABSTRACT

A hybrid power supply type injection molding machine system has a motor-driven injection molding machine body including an injection mechanism and a mold clamping mechanism that are driven by servo-motors; a control device giving a command to said servo-motors to drive said injection mechanism and said mold clamping mechanism in accordance with predetermined program commands; and an electric power supply device for supplying said motor-driven injection molding machine body with the electric power required for operating said motor-driven injection molding machine body, said electric power supply device including: a first electric power supply unit for supplying the electric power from a commercial power source; a second electric power supply unit having an electric power accumulation unit dedicated to said motor-driven injection molding machine; an electric power comparator for comparing outputs of said first and second electric power supply units; and a switching device for switching over a supply of the electric power given to said second electric power supply unit from said first electric power supply unit in response to a result of the comparison by said electric power comparator under predetermined conditions.

11 Claims, 3 Drawing Sheets

INJECTION MOLDING MACHINE SYSTEM

CROSS REFERENCE TO RELATED APPLICATIONS

This application is based upon and claims the benefit of priority from the prior Japanese Patent Applications No. 2002-153354 filed on May 28, 2002 and No. 2003-112936 filed on Apr. 17, 2003; the entire contents of which are incorporated herein by reference.

BACKGROUND OF THE INVENTION

1. Field of the Invention

The present invention relates generally to an injection molding machine system, and more particularly to a power supply system for an injection molding machine.

2. Description of the Background Art

FIG. 3 is a block diagram showing how a conventional power supply is performed in a molding plant in which a motor-driven injection molding machine is operated. Referring to FIG. 3, a substation 1 disposed in a plant PLNT is supplied with high-voltage commercial electric power from outside, wherein the electricity is stepped down to an actually-utilized voltage. The stepped-down electric power in supplied via a power supply line PSLY extending from a power supply wire network 2 in the plant to an injection mechanism of an injection molding machine body 52, a servo-motor for driving a mold clamping mechanism and a drive unit of a peripheral device 53 through a control device 51 or each motor-driven injection molding apparatus 5. Further, other molding-related devices such as a die carrying apparatus 4 are supplied with the electric power.

A power generation equipment 3 for backup is provided in a comparatively-large-scale plant PLNT, wherein a power generation command is given when it is unable to utilize the external power source due to some accident, thereby preventing a stoppage of the production by supplying the electric power for a fixed period of time.

The motor-driven injection molding apparatus 5 shown in FIG. 3 includes a plurality of servo-motors together with an injection mechanism and a molding clamping mechanism, wherein all the servo-motors are driven during a cycle time that lasts several tens of seconds through several minutes. Especially in an injection operation and a mold opening/closing operation, a quick start and a sudden stop are performed at every cycle, and therefore a consumption of the electricity increases to a great degree. Moreover, a consumption of the electricity for a heater of a heating cylinder is not ignorable. It is therefore required that a necessary quantity of total electric power be sufficiently prepared.

In a configuration of the conventional plant illustrated in FIG. 3, if the power supply from the external commercial power source is cut off due to some accident, the power supply from the power supply line PSLY is likewise cut off. In such a case, the control device can instantaneously cope with the power cut-off by use of a backup power source in the case of executing the information processing and storing the data.

There arises, however, such a problem that the instantaneous coping is impossible with respect to the heater and the servo-motors which consume a large quantity of electricity and perform the mechanical operations. This is because the power generation equipment 3 is not always operated in the normal case. Therefore, the power generation equipment 3 is incapable of supplying the electric power as a substitute for the commercial electric power immediately after an occurrence of the accident. Therefore, the drive of the servo-motors related to the mechanical operations and the heating by the heater comes to a uncontrolled state at that point or time.

As a result, a molded product in the making might be hardened as it stays in a die assembly, or a molten resin might be hardened as it resides in a gate and a nozzle member, or the molten resin might be scattered from an abutting surface of the die assembly when the clamping state of the die assembly is slackened, resulting in such a problem that the normal operation can not be promptly restarted even when the state of the power supply is restored normally.

Moreover, if the supplied voltage temporarily descends due to a small short-circuit fault in the plant and simultaneous start-ups of the respective devices in a state where demands for the electricity is close to a limit of supply as in the summer in addition to the case where the commercial power supply is temporarily cut off because of the accident, etc. as described above, the drive of the servo-motor for the motor-driven injection molding machine is not performed as the program instructs. This results in such a problem that the molded product having a predetermined quality can not be obtained.

The injection molding machine has an aspect of process control of molding the molten resin by controlling movements of the mechanical components such as the die assembly, an injection screw, etc. and controlling a temperature, and therefore comes to suffer a serious damage if the power supply falls into an unstable state for even a short period of time.

What has been discussed so far is an example in the case of the plant including the power generation equipment. In the case of a small-scale molding plant including one single or several injection molding machines, however, there is almost no case of its being provided with non-utility power generation equipment. Such a plant depends on only the commercial electric power, and there arise the same problems as those aforementioned.

Further, in the case of a hydraulic drive system injection molding machine also, the same problems are caused by the stoppage of the power supply to a variable capacity pump, a variety of switch values, a motor for driving this pump and so on.

SUMMARY OF THE INVENTION

It is an object of the present invention to provide an injection molding machine system capable of preventing any damage to an injection molding machine due to an interruption and instability of the commercial electric power and the power supply from in-plant power generation equipment.

According to one embodiment of the present invention, there is provided an injection molding machine system comprising:

a motor-driven injection molding machine body including an injection mechanism and a mold clamping mechanism that are driven by servo-motors;

a control device giving a command to said servo-motors to drive said injection mechanism and said mold clamping mechanism in accordance with predetermined program commands; and an electric power supply device for supplying said motor-driven injection molding machine body with the electric power required for operating said motor-driven injection molding machine body, said electric power supply device including:

a first electric power supply unit for supplying the electric power from a commercial power source;

a second electric power supply unit having an electric power accumulation unit dedicated to said motor-driven injection molding machine;

an electric power comparator for comparing outputs of said first and second electric power supply units; and a switching device for switching over a supply of the electric power given to said second electric power supply unit from said first electric power supply unit in response to a result of the comparison by said electric power comparator under predetermined conditions.

According to another embodiment of the present invention, there is provided an injection molding machine system comprising:

an injection molding machine body including an injection mechanism and a mold clamping mechanism;

a control device giving a command of driving said injection mechanism and said mold clamping mechanism in accordance with predetermined program commands; and electric power supply means for supplying the electric power required for operating said injection molding machine through said control device, said electric power supply means including:

first electric power supply means for supplying the electric power from a commercial power source;

second electric power supply means having electric power accumulation means dedicated to said injection molding machine;

electric power comparing means for comparing outputs of said first and second electric power supply means; and switching means for switching over a supply of the electric power given to said second electric power supply means from said first electric power supply means in response to said electric power comparing means under predetermined conditions.

DETAILED DESCRIPTION

Example based on embodiments of the present invention will hereinafter be described in depth with reference to the accompanying drawings.

The present invention was devised based on the knowledge of the inventors about a solution of the problems derived from the interruption and the instability of the commercial electric power and the power supply from the in-plant power generation equipment, the solution being such that an electricity accumulation device serving exclusively for an injection molding machine is provided as a power supply source for the injection molding machine in addition to the commercial electric power and the in-plant power generation equipment.

Figure 1:
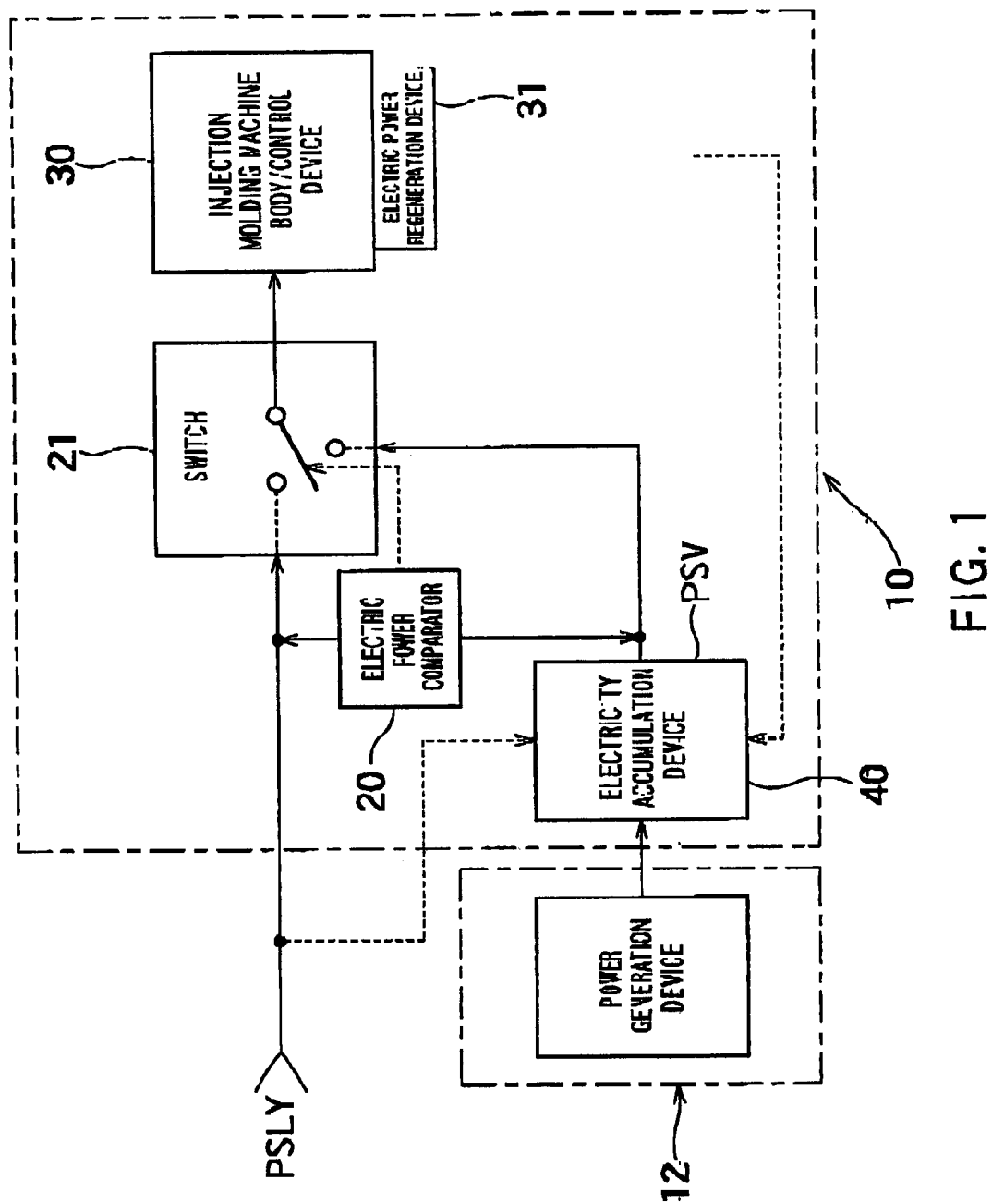
FIG. 1 is a control block diagram showing a construction of a first embodiment of the present invention.

FIG. 1 is a block diagram schematically showing a construction of an injection molding machine system 10 in a first embodiment of the present invention.

Figure 3:
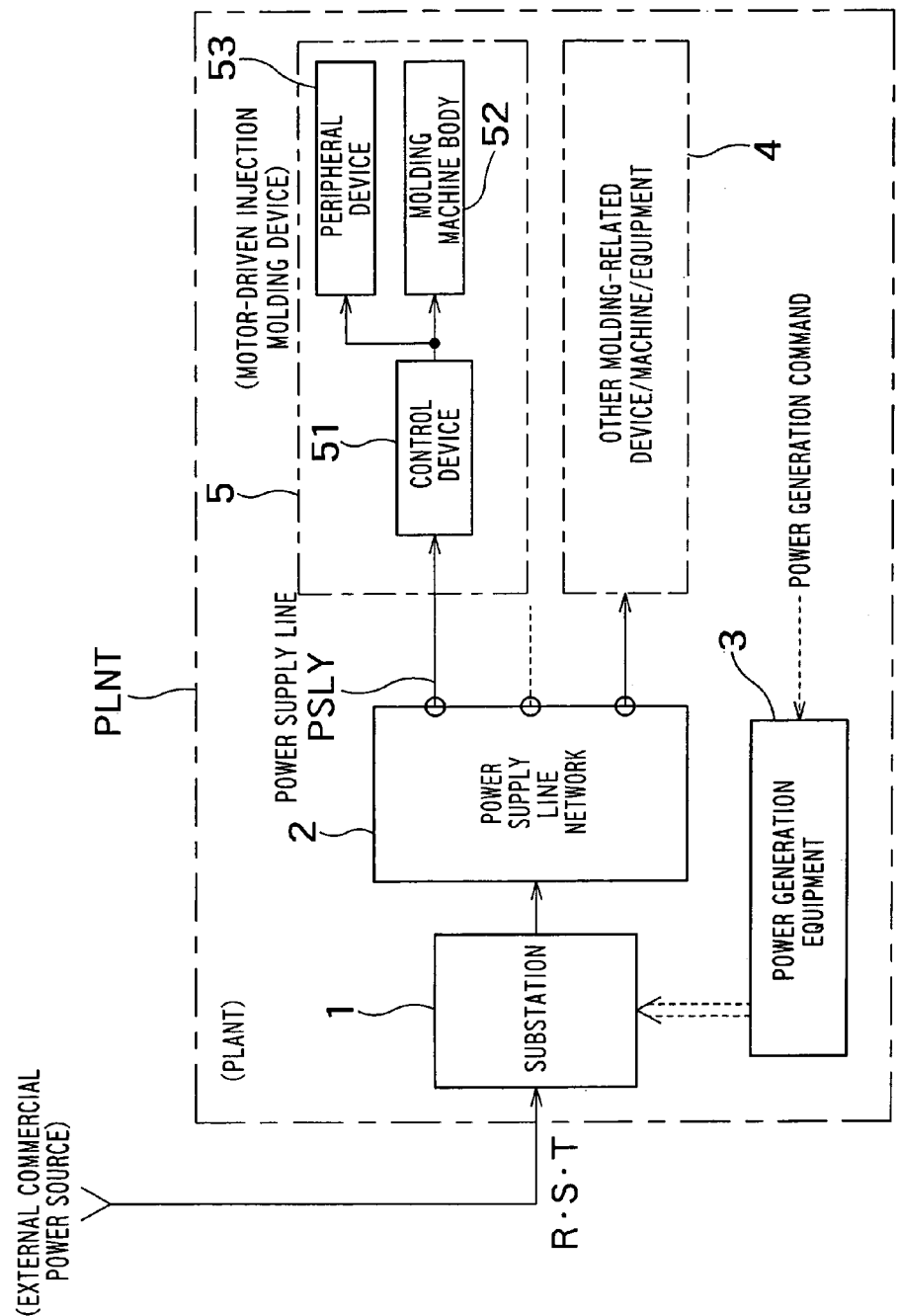
FIG. 3 is an explanatory diagram showing how the electric power is supplied in a molding plant that operates a motor-driven injection molding machine.

An injection molding machine body/control device 30 is the same as the motor-driven injection molding apparatus 5 in FIG. 3, and has a structural concept including peripheral devices. This injection molding machine body/control device 30 is provided with two power supply systems. Namely, one power supply system supplies the electricity via a commercial power supply line PSLY (including the power supply from the in-plant power generation equipment) through a switch 21. Further, the other power supply system supplies the electricity from an electricity accumulation device 40 through the switch 21.

Moreover, an electric power comparator 20 always compares the commercial electric power supplied with an output of an electricity accumulation device PSV. One of comparative judgements for switchover is that magnitudes of the two outputs of the commercial electric power supplied and the output of the electricity accumulation device PSV are judged based on the premise of utilizing the commercial electric power under the condition that the output of the electricity accumulation device PSV meets a predetermined value, and the electricity accumulation device 40 supplies the electric power to the injection molding machine body and the control device 30 thereof by giving a switchover command to the switch 21 from the electric power comparator 20 if a difference, caused from the interruption of the commercial electric power or from an unstable change thereof, exceeds an allowable range.

This switchover can be done extremely quickly and instantaneously, and hence the normal operation can continue without causing any stoppage of the drive of the servo-motor and of heating by the heater as occurred in the prior art even if the interruption and the instability of the commercial electric power occur as in the prior art.

Another comparative judgement is that the electric power is supplied from the electricity accumulation device when the electricity accumulation device still has a sufficient surplus of the electricity even if within the allowable range with no interruption of the supply of the commercial electric power in order to lessen a consumption of the high-cost commercial electric power.

A power generation device 12 is provided separately from the commercial electric power and serves to electrify the electricity accumulation device 40. Note that this electricity accumulation device 40 is provided substantially exclusive for the injection molding machine body and the control device 30 thereof. The exclusive provision here does not necessarily imply a limit to one single injection molding machine, however, it is preferable in terms of being uninfluenced by operating states of other injection molding machines that the electricity accumulation device 40 be dedicated to one specified injection molding machine.

It is preferable in terms of the global environment and a running cost that the power generation device 12 be constructed as a power generation system utilizing clean natural energies such as solar power generation, wind power generation and so on. It is also feasible to utilize a fuel cell of which a performance has been remarkably improved.

Referring again to FIG. 1, the single power generation device is paired with the single electricity accumulation device 40, however, a set of these device are not necessarily the requirement. The single power generation device, if sufficient of its capacity, can be constructed to electrify a plurality of electricity accumulation devices 40.

Note that the electricity accumulation device 40 can be also electrified, as depicted by a broken line, via the commercial power supply line PSLY. This is exemplified such as utilizing the electric power in a low-power-rate time zone with a comparatively small demand for the electric power as in the midnight. In consequence, this enables the running cost to be decreased.

Moreover, a broken line extending from the injection molding machine body/control device 30 to the electricity accumulation device PSV shows an example of such an construction that a servo-motor for the injection molding machine is provided with an electric power regeneration device 31 for regenerating the electric power discharged at a sudden stop performed at every molding cycle of an injection mechanism and a mold clamping mechanism and supplying the regenerated electric power to the electricity accumulation device 40. In this case, the regeneration of the electric power is not conditioned by whether the drive is executed by utilizing the electric power supplied from any one of the commercial electric power supply line PSLY and the electricity accumulation device 40.

In the case of this configuration also, the energy is effectively utilized, with the result that the running cost can be decreased.

Figure 2:
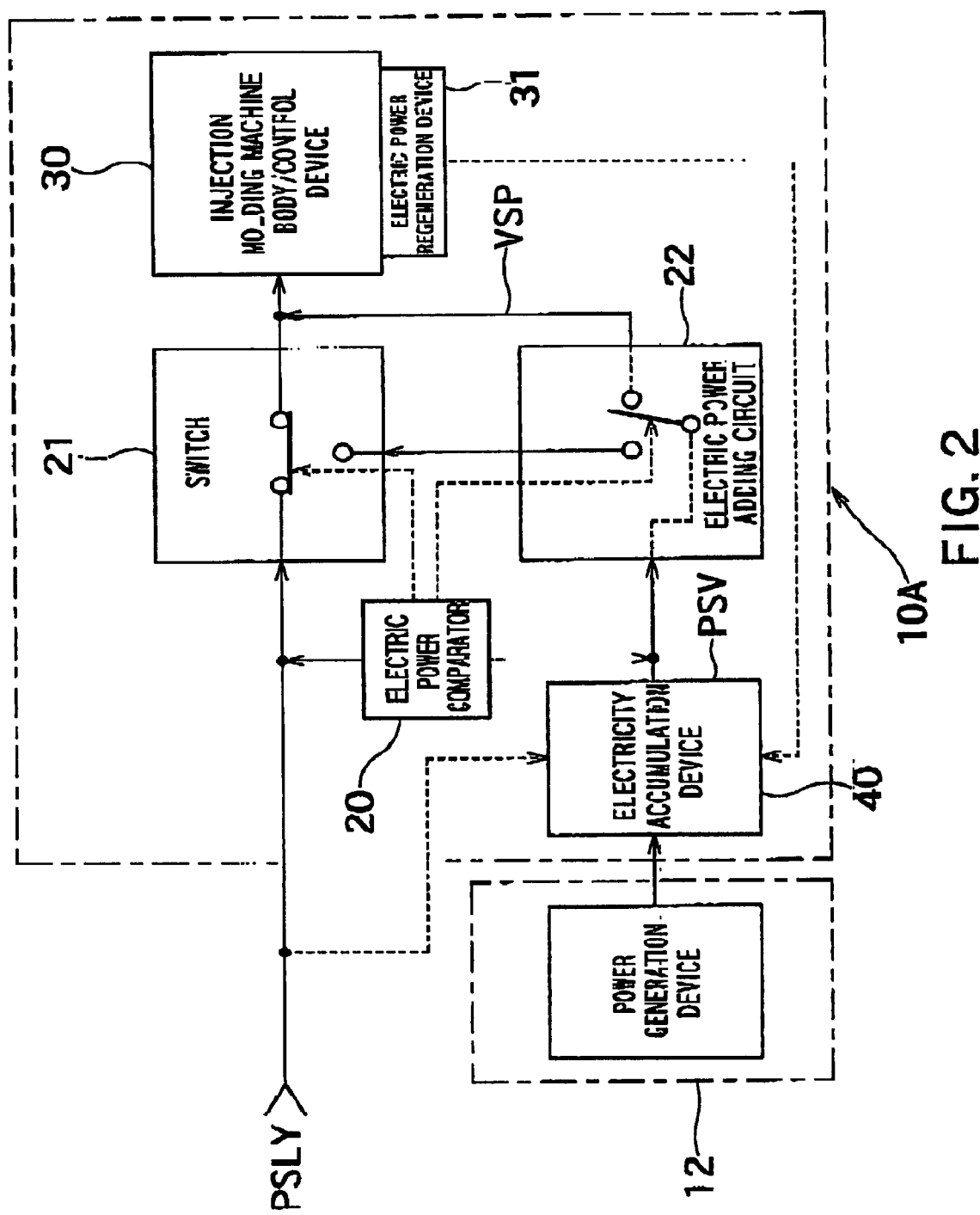
FIG. 2 is a control block diagram showing a construction of a second embodiment of the present invention, wherein a voltage bias circuit is added to the construction shown in FIG. 1.

FIG. 2 is a block diagram showing a second embodiment of the present invention. The second embodiment will exemplify an injection molding machine system 10A in a case where an electric power adding circuit 22 is added to the construction of the injection molding machine system 10 illustrated in FIG. 1.

Referring to FIG. 2, the electric power adding circuit 22 is provided between the electricity accumulation device 40 and the switch 21, and is defined as a switch for making a switchover as to whether the electric power from the electricity accumulation device 40 is added to the commercial electric power or not.

The discussion will be focused on the operation in the second embodiment. If there are fluctuations in voltage in a state of being supplied with the commercial electric power, the electric power comparator 20 gives, when making a comparative judgment and if a difference therebetween exceeds an allowable range, an electric power adding command to the electric power adding circuit 22, whereby an influence of power-supply fluctuations can be prevented from being exerted on the injection molding machine by adding the electric power from the electricity accumulation device PSV in superposition onto the supply line of the commercial power source.

On the other hand, if the commercial electric power changes unstably and when a difference therebetween exceeds the allowable range, the electric power comparator 20 issues a switchover command to the electric power adding circuit 22 to make a switchover to the switch 21 and further issues a switchover command to the switch 21 to make the switchover to the electric power adding circuit 22. As a result, the electricity accumulation device 40 supplies the electric power to the injection molding machine body/control device 30.

The preferred embodiments of the present invention have been discussed so far, however, it is obvious to those skilled in the art that the present invention can be modified in a variety of forms based on the spirit of the present invention.

For example, referring to FIGS. 1 and 2, the switch 21 and the electric power adding circuit 22 are disposed separately from the control device, as one unit, of the injection molding machine body/control device 30. It is, however, possible to easily configure the switch 21 and the electric power adding circuit 22 as a part of the control device and to design software to implement softwarewise a comparative judgement as to a quantity of the suppliable electric power through ever-monitoring by the control device, wherein a plurality of criteria for judgement are prepared, and the judgement criterion is selectively designated in consideration of a state of supplying the electric power in accordance with the time and the time zone.

Further, if the supply of the electric power is cut off from outside, and when judging that the operation of the injection molding machine is impossible of its continuation due to a small surplus of the electric power accumulated, the injection molding machine can be stopped in a safety state.

According to the present invention, there are provided the commercial power supply line defined as a first electric power supply means and the electricity accumulation device dedicated to the injection molding machine defined a second electric power supply means, outputs thereof are comparatively judged, and one of these electric power supply means can be selected based on this judgement. Hence, there are exhibited such effects that it is possible to avoid a damage to the injection molding machine which is derived from the interruption of the supply of the commercial electric power and the temporary instability thereof and to reduce the cost for the electric power by receiving the supply of the electric power from the electricity accumulation device even in the normal supply state of the commercial electric power if the electricity accumulation device is capable of supplying the sufficient electric power, and so on. In this case, if the electric power for electrifying the electricity accumulation device is supplied via a power generation device based on the natural energy, the injection molding machine can be operated in consideration of the global environment.

Further, the electric power adding circuit is provided between the electricity accumulation device and the switch, the electric power from the electricity accumulation device is superposed on the commercial electric power if unstable of the supply of the commercial electric power, where the stable power supply can be attained.

What is claimed is:

1. An injection molding machine system comprising:
   a motor-driven injection molding machine body including an injection mechanism and a mold clamping mechanism that are driven by servo-motors;
   a control device giving a command to said servo-motors to drive said injection mechanism and said mold clamping mechanism in accordance with predetermined program commands; and
   an electric power supply device for supplying said motor-driven injection molding machine body with the electric power required for operating said motor-driven injection molding machine body,
   said electric power supply device including:
   a first electric power supply unit for supplying the electric power from a commercial power source;
   a second electric power supply unit having an electric power accumulation unit dedicated to said motor-driven injection molding machine;
   an electric power comparator for comparing outputs of said first and second electric power supply units; and
   a switching device for switching over a supply of the electric power given to said second electric power supply unit from said first electric power supply unit in response to a result of the comparison by said electric power comparator under predetermined conditions.

2. The injection molding machine system according to claim 1, wherein said electric power supply device further includes an electric power adding unit for adding in superposition, when said first electric power supply unit supplies the electric power to said control device, the electric power from said second electric power supply unit onto said control device.

3. The injection molding machine system according to claim 2, wherein said second electric power supply unit includes a power generation device separately from the commercial power source, and supplies said electric power accumulation unit with the electric power supplied from said power generation device.

4. The injection molding machine system according to claim 3, wherein said power generation device is a power generation device based on natural energies.

5. The injection molding machine system according to claim 4, wherein said power generation device based on the natural energies is a solar power generation device.

6. The injection molding machine system according to claim 4, wherein said power generation device based on the natural energies is a wind power generation device.

7. The injection molding machine system according to claim 3, wherein said power generation device a power generation device using a fuel battery.

8. The injection molding machine system according to claim 1 or 2, wherein the electric power supplied from the commercial power source is accumulated in said electric power accumulation unit of said second electric power supply unit.

9. The injection molding machine system according to claim 1 or 2, wherein said servo-motor includes a electric power regeneration device, and said electric power accumulation unit is accumulated with a regenerative energy from said electric power regeneration device.

10. An injection molding machine system comprising:
an injection molding machine body including an injection mechanism and a mold clamping mechanism;
a control device giving a command of driving said injection mechanism and said mold clamping mechanism in accordance with predetermined program commands; and
electric power supply means for supplying the electric power required for operating said injection molding machine,
said electric power supply means including:
first electric power supply means for supplying the electric power from a commercial power source;
second electric power supply means having electric power accumulation means dedicated to said injection molding machine;
electric power comparing means for comparing outputs of said first and second electric power supply means; and
switching means for switching over a supply of the electric power given to said second electric power supply means from said first electric power supply means in response to said electric power comparing means under predetermined conditions.

11. The injection molding machine system according to claim 10, wherein said electric power supply device further includes an electric power adding unit for adding in superposition, when said first electric power supply means supplies the electric power to said control device, the electric power from said second electric power supply means onto said control device.

* * * * *